(12) United States Patent
Lee et al.

(10) Patent No.: US 11,125,261 B2
(45) Date of Patent: Sep. 21, 2021

(54) RIVET FASTENER ASSEMBLIES

(71) Applicant: ILLINOIS TOOL WORKS INC., Glenview, IL (US)

(72) Inventors: Joel R. Lee, Peotone, IL (US); Mark O. Lepper, Oak Park, IL (US)

(73) Assignee: Illinois Tool Works Inc., Glenview, IL (US)

( * ) Notice: Subject to any disclaimer, the term of this patent is extended or adjusted under 35 U.S.C. 154(b) by 260 days.

(21) Appl. No.: 16/320,037

(22) PCT Filed: Jul. 12, 2017

(86) PCT No.: PCT/US2017/041636
§ 371 (c)(1),
(2) Date: Jan. 23, 2019

(87) PCT Pub. No.: WO2018/031168
PCT Pub. Date: Feb. 15, 2018

(65) Prior Publication Data
US 2019/0264722 A1    Aug. 29, 2019

Related U.S. Application Data

(60) Provisional application No. 62/374,129, filed on Aug. 12, 2016.

(51) Int. Cl.
*F16B 19/10* (2006.01)
*F16B 13/08* (2006.01)
*F16B 13/06* (2006.01)

(52) U.S. Cl.
CPC ...... *F16B 19/1054* (2013.01); *F16B 19/1045* (2013.01); *F16B 13/061* (2013.01); *F16B 13/068* (2013.01); *F16B 13/0808* (2013.01)

(58) Field of Classification Search
CPC .............. F16B 19/1054; F16B 19/1045; F16B 19/1072; F16B 13/068; F16B 13/061;
(Continued)

(56) References Cited

U.S. PATENT DOCUMENTS 1,161,155 A    11/1915   Pleister
2,324,142 A *   7/1943   Eklund ............... F16B 19/1072
                                                              411/38

(Continued)

FOREIGN PATENT DOCUMENTS

CN    1521412 A     8/2004
CN    201428676 Y   3/2010
(Continued)

OTHER PUBLICATIONS

International Search Report for PCT/US2017/041636, dated Oct. 5, 2017. (11 pages).

(Continued)

*Primary Examiner* — Victor D Batson
*Assistant Examiner* — Amit Singh Dhillon
(74) *Attorney, Agent, or Firm* — Quarles & Brady LLP

(57) ABSTRACT

A rivet fastener assembly is configured to securely clamp onto one or more components. The rivet fastener assembly includes a grommet including a collar and a column extending from the collar. A passage is defined through the collar and the column. The column includes component-engaging legs that are configured to fold and directly contact the component(s) when folded, and reinforcing legs that are configured to fold and reinforce the component-engaging legs when folded as the component-engaging legs directly contact the components).

17 Claims, 8 Drawing Sheets

(58) Field of Classification Search
CPC ...... F16B 13/065; F16B 13/066; F16B 13/06; F16B 13/0808; F16B 19/109
See application file for complete search history.

(56) References Cited

U.S. PATENT DOCUMENTS

| | | | |
|---|---|---|---|
| 2,964,989 A | 12/1960 | Frederick | |
| 3,230,818 A * | 1/1966 | Siebol | B21J 15/045 411/34 |
| 3,236,143 A * | 2/1966 | Wing | F16B 37/067 411/34 |
| 3,279,304 A | 10/1966 | Hopkins | |
| 3,512,448 A | 5/1970 | Summerlin | |
| 3,789,727 A | 2/1974 | Moran | |
| 3,858,479 A | 1/1975 | Sekhon | |
| 4,170,920 A * | 10/1979 | Siebol | F16B 19/1054 411/43 |
| 4,211,145 A | 7/1980 | Dolch | |
| 4,285,265 A * | 8/1981 | Rieper | F16B 19/1054 411/34 |
| 4,312,613 A * | 1/1982 | Binns | F16B 19/1063 411/34 |
| 4,475,856 A | 10/1984 | Toomingas | |
| 4,541,761 A * | 9/1985 | Bryce, Jr. | F16B 19/10 411/34 |
| 4,556,351 A | 12/1985 | Wollar et al. | |
| 4,585,382 A * | 4/1986 | Bryce, Jr. | F16B 19/10 411/34 |
| 4,610,587 A | 9/1986 | Wollar et al. | |
| 4,639,175 A | 1/1987 | Wollar | |
| 4,642,009 A | 2/1987 | Fischer | |
| 4,708,553 A | 11/1987 | Braychak et al. | |
| 4,863,325 A | 9/1989 | Smith | |
| 4,875,815 A | 10/1989 | Phillips, II | |
| 4,890,966 A | 1/1990 | Umezawa | |
| 5,018,919 A | 5/1991 | Stephan | |
| 5,205,688 A | 4/1993 | Sundstrom | |
| 5,244,324 A * | 9/1993 | Smith | F16B 13/0808 411/340 |
| 5,690,454 A | 11/1997 | Smith | |
| 5,725,341 A * | 3/1998 | Hofmeister | F16B 13/061 411/258 |
| 6,551,040 B1 | 4/2003 | Terry et al. | |
| 6,609,866 B2 | 8/2003 | Huang et al. | |
| 6,719,509 B1 | 4/2004 | Huang et al. | |
| 6,746,191 B2 | 6/2004 | Edland | |
| 6,761,520 B1 * | 7/2004 | Dise | F16B 33/002 411/113 |
| 6,835,038 B2 | 12/2004 | Benito-Navazo | |
| 6,969,220 B2 | 11/2005 | Anquetin | |
| 7,621,950 B1 | 11/2009 | Globerman et al. | |
| 7,887,273 B2 | 2/2011 | Vigliotti et al. | |
| 8,602,703 B1 | 12/2013 | Rich | |
| 8,728,160 B2 | 5/2014 | Globerman et al. | |
| 8,911,190 B2 * | 12/2014 | Saltenberger | F16B 19/1045 411/38 |
| 9,062,703 B2 | 6/2015 | Schneider et al. | |
| 9,309,906 B2 | 4/2016 | Hsu | |
| 9,453,524 B2 | 9/2016 | Sisto | |
| 2002/0106255 A1 * | 8/2002 | Edland | F16B 13/0808 411/3 |
| 2002/0154963 A1 * | 10/2002 | Jennings | F16B 19/1054 411/43 |
| 2005/0013678 A1 * | 1/2005 | Smith | F16B 19/1072 411/43 |
| 2006/0182512 A1 * | 8/2006 | Williams | F16B 19/1054 411/41 |
| 2007/0059120 A1 | 3/2007 | Vigliotti et al. | |
| 2012/0210557 A1 * | 8/2012 | Jones | B21J 15/365 29/525.06 |
| 2013/0243542 A1 | 9/2013 | Saltenberger et al. | |
| 2013/0280005 A1 * | 10/2013 | Lepper | F16B 19/1027 411/15 |
| 2014/0377030 A1 | 12/2014 | Dunford et al. | |
| 2018/0238371 A1 | 8/2018 | Cochard et al. | |
| 2019/0264722 A1 | 8/2019 | Lee et al. | |
| 2020/0116184 A1 | 4/2020 | Lee | |

FOREIGN PATENT DOCUMENTS

| | | | | |
|---|---|---|---|---|
| CN | 201428676 Y | * | 3/2010 | |
| CN | 202165364 U | | 3/2012 | |
| DE | 102010002847 A1 | | 9/2011 | |
| DE | 102011106436 A1 | | 1/2013 | |
| DE | 202013005407 U1 | | 8/2013 | |
| DE | 102014104539 A1 | | 10/2015 | |
| EP | 0691479 A1 | * | 1/1996 | ......... F16B 19/1054 |
| EP | 0691479 A1 | | 1/1996 | |
| EP | 1728569 A1 | | 12/2006 | |
| GB | 2185081 A | * | 7/1987 | ............ F16B 13/061 |
| GB | 2412417 A | * | 9/2005 | ............ F16B 13/061 |
| GB | 2412417 A | | 9/2005 | |
| WO | 2011094056 A1 | | 8/2011 | |
| WO | WO-2011094056 A1 | * | 8/2011 | ......... F16B 19/1072 |
| WO | 2018031168 A1 | | 2/2018 | |

OTHER PUBLICATIONS

First Office Action from corresponding Chinese Patent Application No. 201780048642.0, dated May 22, 2020 (16 pages).

Examination Report for German Patent Application No. 10 2019 101 078.0, dated Dec. 1, 2020—no translation available (10 pages).

* cited by examiner

RIVET FASTENER ASSEMBLIES

RELATED APPLICATIONS

This application represents the United States National Stage of International Application No. PCT/US2017/041636, filed Jul. 12, 2017, which claims priority to U.S. Provisional Patent Application No. 62/374,129 entitled "Rivet Fastener Assembly," filed Aug. 12, 2016, which is hereby incorporated by reference in its entirety.

FIELD OF EMBODIMENTS OF THE DISCLOSURE

Embodiments of the present disclosure generally relate to fastener assemblies, and, more particularly, to fastener assemblies that are configured to secure two components together, such as panels within a vehicle.

BACKGROUND

During a manufacturing process of a vehicle, various components are secured to one another. For example, an interior frame panel may be secured to an exterior door panel, or an air bag assembly may be secured to an interior door panel or glove compartment panel. As another example, a trim panel may be secured to a wheel liner. Typically, components are secured together through one or more fasteners.

WO 2011/094056 discloses a fastener assembly. U.S. Pat. No. 7,887,273 discloses a blind rivet and method. U.S. Pat. No. 6,761,520 discloses a clinch-type blind nut. U.S. Pat. No. 5,846,039 discloses a positive lock rivet.

Many known plastic rivet style fasteners are configured to fit into a hole of a of particular size. If the hole is not the particular size, the component is typically modified to accommodate the fastener.

Further, many known plastic rivet style fasteners are typically not configured to be easily serviced and/or removed from a component. An installed rivet style fastener may be removed, but removal often risks damaging paint on exterior applications and finished surfaces. Also, a known single lock plastic rivet style fastener typically loses retention strength as a load moves away from the centerline of the fastener.

SUMMARY OF EMBODIMENTS OF THE DISCLOSURE

A need exists for a rivet fastener assembly that does not require a hole of a component to be modified in order to be used. Further, a need exists for a rivet fastener assembly that is configured to be used with existing trim and panel holes, and allows for a wider range of hole shapes and sizes. Also, a need exists for a rivet fastener assembly that may be installed without specialized tools. Moreover, a need exists for a rivet fastener assembly that is configured to be easily serviced and removed.

With those needs in mind, certain embodiments of the present disclosure provide a rivet fastener assembly that is configured to securely clamp onto one or more components. The rivet fastener assembly includes a grommet including a collar and a column extending from the collar. A passage is defined through the collar and the column. The column includes component-engaging legs that are configured to fold and directly contact the component(s) when folded. Reinforcing legs are configured to fold and reinforce the component-engaging legs when folded as the component-engaging legs directly contact the component(s). In at least one embodiment, the component-engaging legs and the reinforcing legs are configured to be moved between a linear at-rest state and a folded state. In at least one embodiment, the component-engaging legs are longer than the reinforcing legs.

The rivet fastener assembly may also include a pin that is configured to secure into the passage of the grommet. The pin is configured to be pulled relative to the grommet when the rivet fastener assembly is coupled to the component(s) in order to fold the component-engaging legs and the reinforcing legs. The pin may be configured to threadably secure to the grommet within at least a portion of the passage. In other embodiment, the pin may secured to the grommet within at least a portion of the passage through an interference or press fit, a tongue and groove connection, a rib and a slot connection, and/or the like.

The grommet may include opposed standoff members. The opposed standoff members cooperate to halt further folding of the component-engaging legs and the reinforcing legs. In at least one embodiment, the reinforcing legs provide straightened bracing supports when the opposed standoff members contact one another. An interaction of the opposed standoff members controls a shape of the reinforcing legs as the reinforcing legs are folded.

The grommet may include one or more tear slots that are configured to be engaged by a tool in order to remove one or more tabs. Removal of the tab(s) facilitates removal of the rivet fastener assembly from the component(s). The grommet may also include one or more shields proximate to the tear slot(s). The shield(s) protect the component(s) from damage during removal of the rivet fastener assembly from the component(s).

The grommet may include one or more interfering protuberances that are configured to limit axial movement of the rivet fastener assembly in relation to the component(s).

The column of the grommet may include one or more flex members that are inwardly-directed into the passage. The flex member(s) are configured to facilitate flexing of one or both of the component-engaging legs and the reinforcing legs.

Certain embodiments of the present disclosure provide a securing system that includes one or more components, and a rivet fastener assembly that securely clamps onto the component(s).

Figure 1:
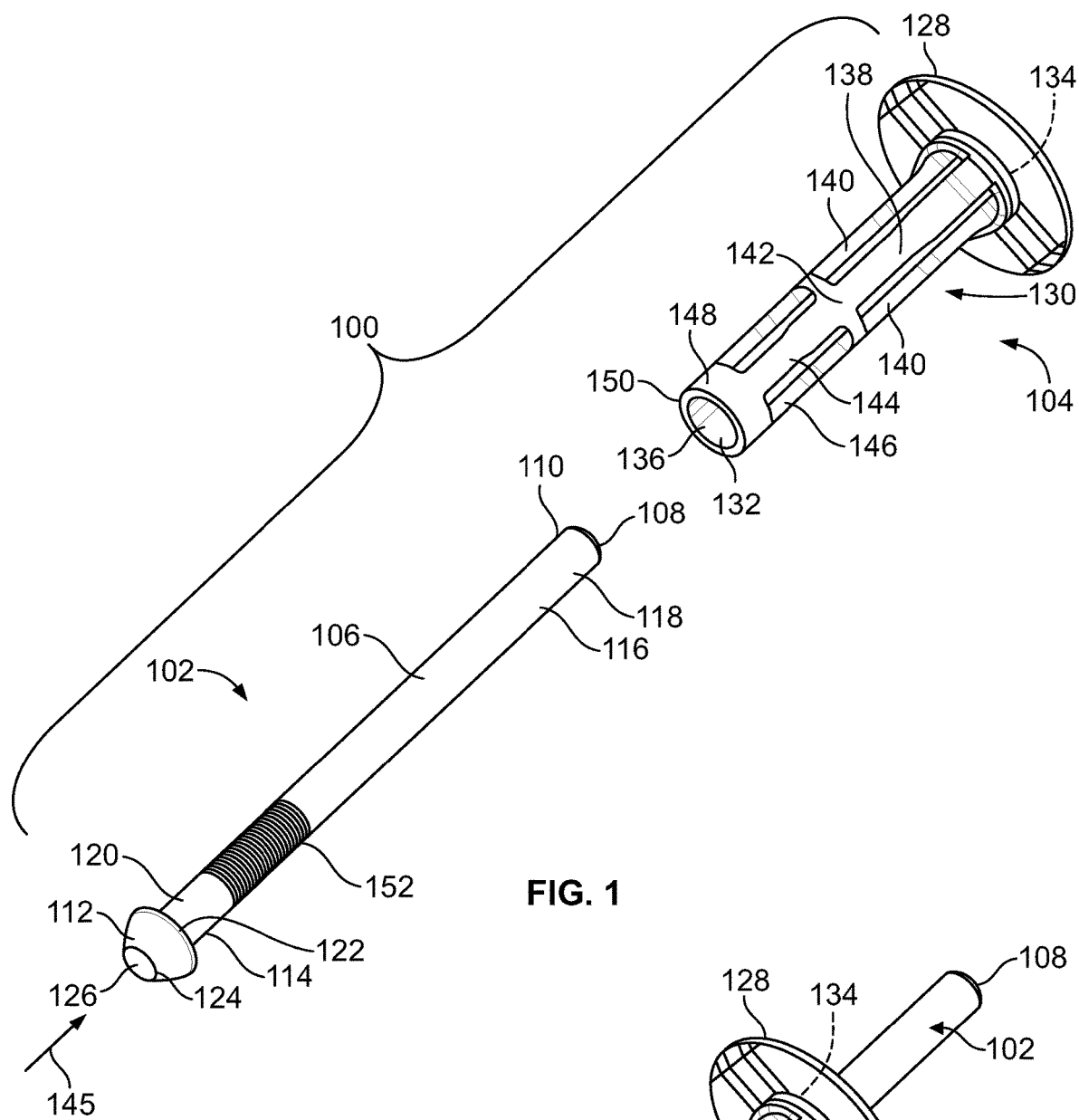
FIG. 1 illustrates a perspective exploded view of a rivet fastener assembly, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Certain embodiments of the present disclosure provide a rivet fastener assembly that does not require a hole of a component to be modified in order to be used. Instead, the rivet fastener assembly is configured to be used with existing trim and panel holes, and allows for a wider range of hole shapes and sizes. Further, the rivet fastener assembly may be installed without specialized tools. Also, the rivet fastener assembly is configured to be easily serviced and removed.

In at least one embodiment, the rivet fastener assembly includes layered legs. For example, the rivet fastener assembly includes component-engaging legs that are configured to overlay reinforcing legs in folded conditions. The reinforcing legs are configured to fold, abut into and reinforce the component-engaging legs that interact with one or more component(s) (that are fastened), thereby creating a strong and robust fastening connection. In at least one embodiment, the rivet fastener assembly is configured to attach to and clamp multiple panels made of relatively soft materials together. A higher retention force is achieved by reinforcing the component-engaging legs.

The rivet fastener assembly includes various features that allow for removal of the fastener assembly from a component. The removal process eliminates, minimizes, or otherwise reduces the potential for damage to components. The reinforcing legs are configured to move fulcrums of the component-engaging legs outward, thereby reinforcing a retention force around an opening of any hole into which the fastener assembly is secured.

FIG. 1 illustrates a perspective exploded view of a rivet fastener assembly 100, according to an embodiment of the present disclosure. FIG. 1 illustrates the rivet fastener assembly 100 in an unassembled state. The rivet fastener assembly 100 includes a pin 102 and a grommet 104. The grommet 104 is configured to receive the pin 102. The pin 102 and the grommet 104 may be formed of one or more plastics, for example.

The pin 102 includes a longitudinal main body 106 having a rounded head 108 at a first end 110 and a beveled nose 112 at a second end 114 that is opposite from the first end 110. The rounded head 108 connects to a shaft 116. The rounded head 108 may be a hemispherical protuberance extending from an end 118 of the shaft 116. Optionally, the head 108 may not be rounded.

The nose 112 extends from an end 120 of the shaft 116 that is opposite from the end 118. The nose 112 includes a circumferential lip 122 that extends from the end 120. The lip 122 may be a blunted edge having a diameter that is greater than the diameter of the end 120 of the shaft 116. A tapered or lead-in tip 124 outwardly extends from the lip 122 away from the end 120 of the shaft 116. The diameter of the tapered tip 124 decreases with increased distance from the end 120. For example, the tapered tip 124 inwardly angles from the lip 122 to a distal end 126.

The grommet 104 includes an annular collar 128 and a flexible pin-receiving column 130 extending from the collar 128. The collar 128 and the column 130 may be coaxially aligned. The column 130 includes an opening 132 that connects to an opening 134 of the collar 128 through a central passage 136.

The column 130 includes first or component-engaging legs 138 extending downwardly from the collar 128. The first legs 138 are flexible, linear beams (in the unassembled state) that are separated from one another by radial gaps 140. In at least one embodiment, the column 130 includes two component-engaging legs 138 separated by the gaps 140. Optionally, the column 130 may include more than two component-engaging legs 138. The first or component-engaging legs 138 are configured to directly contact a component when the legs 138 are folded (and outwardly flattened) and the component is sandwiched between the collar 128 and the folded legs 138.

The first legs 138 connect to an intermediate annular rim 142 that is generally perpendicular to the orientation of the first legs 138 in the unassembled state. The rim 142 is positioned between the collar 128 and the opening 132 at the distal end of the grommet 104.

The column 130 also includes second or reinforcing legs 144 that extend downwardly from the rim 142 opposite from the first legs 138. The second legs 144 are flexible, linear beams (in the unassembled state) that are separated from one another by radial gaps 146. The second legs 144 connect to a distal rim 148 that is distally located from the collar 128. The rim 148 defines the opening 132. In at least one embodiment, the column 130 includes two reinforcing legs 144 separated by the gaps 146. Optionally, the column 130 may include more than two reinforcing legs 144. The second legs 144 are configured to fold, outwardly flatten (when folded), and directly abut into and reinforce the first legs 138 when the first legs 138 are folded and a component is sandwiched between the collar 128 and the folded first legs 138.

As shown, the first legs 138 may be longer than the second legs 144. The shorter second legs 144 provide a stiffer, more robust reinforcing support when folded that is less susceptible to bending as compared to longer legs. In this manner, the shorter second legs 144 provide a stiff and robust support for the first legs when folded. In at least one other embodiment, the first legs 138 and the second legs 144 may be at least approximately the same length. Alternatively, the second legs 144 may be longer than the first legs 138.

It is to be understood that the terms first and second are interchangeable. That is, the first legs 138 may be considered second legs, while the second legs 144 may be considered first legs. As another example, the first end 110 may be considered a second end, while the second end 114 may be considered a first end.

In order to assemble the rivet fastener assembly 100, the head 108 of the pin 102 is axially aligned with the opening 132 and urged into the opening 132 in the direction of arrow 145. The pin 102 continues to be urged into the passage 136 so that the head 108 passes out of the opening 134 of the collar 128. Further movement of the pin 102 in the direction of arrow 145 is halted when the lip 122 abuts against an exposed edge 150 of the rim 148. As shown, the pin 102 may also include a securing portion 152 (which may include one or more retention features) that is configured to securely couple to reciprocal features within the grommet 104, in order to maintain the pin 102 in an assembled state. For example, the example, the securing portion 152 may be a threaded portion that threadably engages internal threads formed in the column 130 proximate to the collar 128. Optionally, the securing portion 152 may be configured to engage the column 130 via other connections, such as an interference or press fit, a tongue and groove connection, a rib and slot connection, and/or the like.

Figure 2:
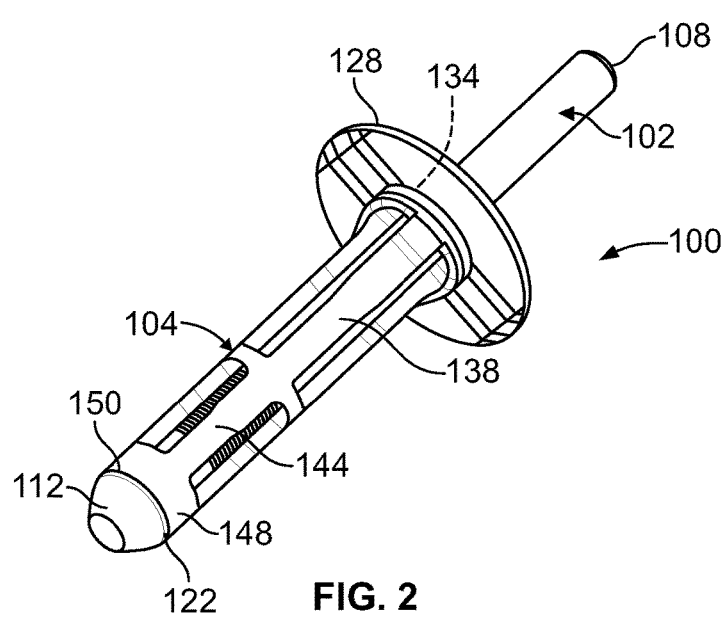
FIG. 2 illustrates a perspective view of a rivet fastener assembly, according to an embodiment of the present disclosure.
Figure 3:
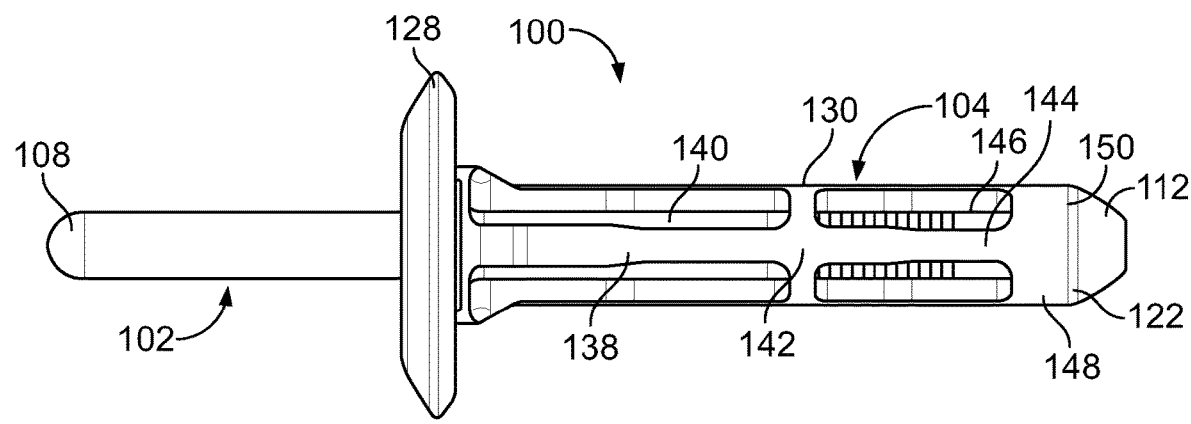
FIG. 3 illustrates a lateral view of a rivet fastener assembly, according to an embodiment of the present disclosure.
Figure 4:
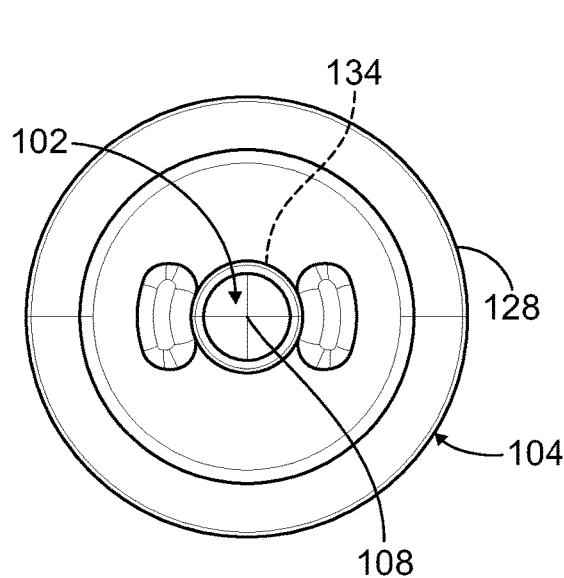
FIG. 4 illustrates a first end view of a rivet fastener assembly, according to an embodiment of the present disclosure.
Figure 5:
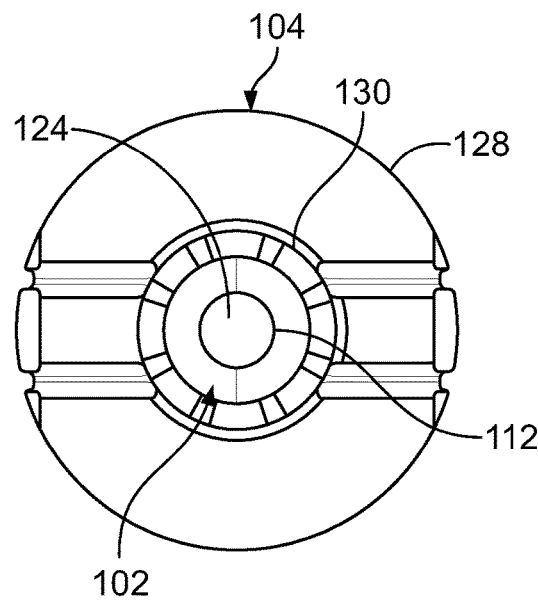
FIG. 5 illustrates a second end view (that is opposite the first end view of FIG. 4) of a rivet fastener assembly, according to an embodiment of the present disclosure.

FIG. 2 illustrates a perspective view of the rivet fastener assembly 100. FIG. 3 illustrates a lateral view of the rivet fastener assembly 100. FIG. 4 illustrates a first end view of the rivet fastener assembly 100. FIG. 5 illustrates a second end view (that is opposite the first end view of FIG. 4) of the rivet fastener assembly 100. FIGS. 2-5 show the rivet fastener assembly 100 in the assembled state. Referring to FIGS. 2-5, in the assembled state, the end 110 of the pin 102 including the head 108 extends outwardly through the opening 134 formed through the collar 128. Further, the nose 112 abuts against the edge 150 of the rim 148. In particular, the lip 122 abuts against the exposed edge 150 of the rim 148.

Figure 6:
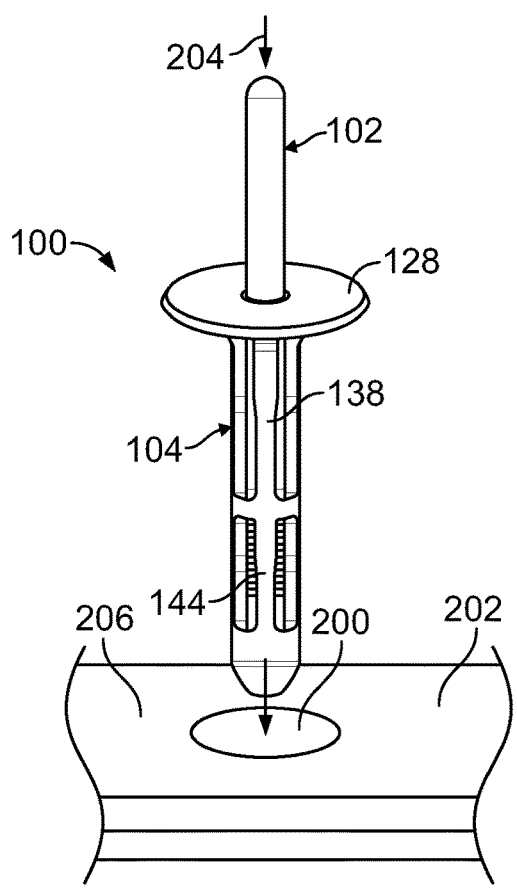
FIG. 6 illustrates a perspective view of a rivet fastener assembly axially aligned with a hole of a component, according to an embodiment of the present disclosure.

FIG. 6 illustrates a perspective view of the rivet fastener assembly 100 axially aligned with a hole 200 of a component 202 (such as one or more panels) according to an embodiment of the present disclosure. In order to secure the rivet fastener assembly 100 to the component 202, the rivet fastener assembly 100 is first urged into the hole 200 of the component 202 in the direction of arrow 204 until the collar 128 (which has a greater diameter than the hole 200) abuts into an outer surface 206 of the component 202 that surrounds the hole 200.

Figure 7:
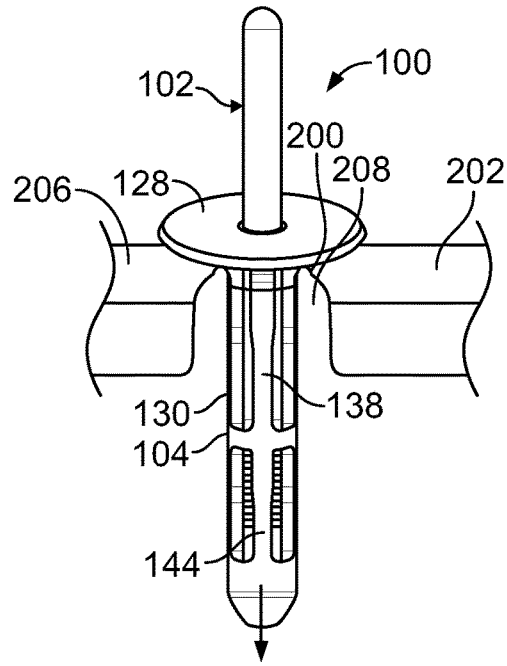
FIG. 7 illustrates a perspective view of a rivet fastener assembly initially mated with a component, according to an embodiment of the present disclosure.

FIG. 7 illustrates a perspective view of the rivet fastener assembly 100 initially mated with the component 202. As shown, the column 130 extends through a channel 208 of the component 202 and the collar 128 abuts against the outer surface 206 that surrounds the hole 200 that leads into the channel 208. As shown in FIG. 7, the legs 138 and 144 are in at-rest, linear states.

Figure 8:
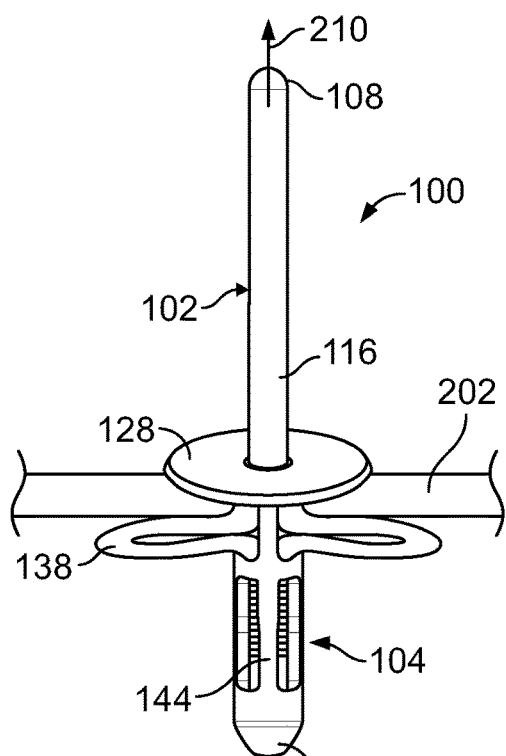
FIG. 8 illustrates a perspective view of a rivet fastener assembly mated with a component in which a pin is upwardly pulled in relation to a grommet, according to an embodiment of the present disclosure.

FIG. 8 illustrates a perspective view of the rivet fastener assembly 100 mated with the component 202 in which the pin 102 is upwardly pulled in relation to the grommet 104. In order to securely clamp the component 202 between the collar 128 and the legs 138, the pin 102 is upwardly pulled in the direction of arrow 210. By pulling the pin 102 in this manner, the nose 112 forces the column 130 upwardly in response, thereby causing the legs 144 to fold, outwardly flatten, and directly engage an underside of the component 202 (opposite from the surface of the component 202 that is directly contacted by the collar 128).

When fully inserted into the component 202, as shown in FIG. 8, a common rivet tool may hold the grommet 104 in place, and the pin 102 may be upwardly (as shown in FIG. 8) pulled in the direction of arrow 210. As the pin 102 is upwardly pulled, the nose 112 of the pin 102 forces the grommet 104 upwardly in the same direction, thereby causing the first legs 138 to fold radially outward. The component 202 is trapped between the collar 128 and the folded first legs 138. The legs 138 are sized in order to have a larger span when folded than a diameter (or span) of the hole 200 of the component 202, thereby ensuring that the fastener assembly 100 securely clamps to component(s) 202 having various sized openings. The folded first legs 138 clamp the component(s) 202 (such as multiple panels) firmly together between the folded first legs 138 and the collar 128. The portion of the shaft 116 extending above the collar 128 may then be removed (such as via breaking or cutting).

Figure 9:
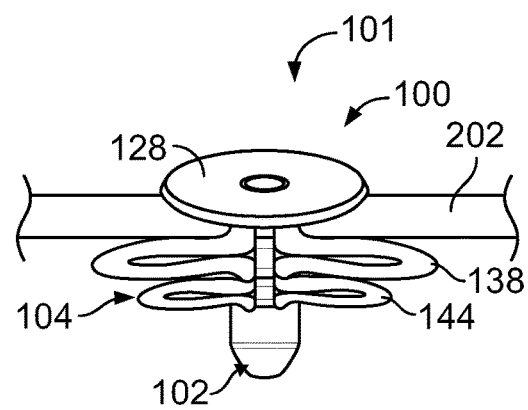
FIG. 9 illustrates a perspective view of a rivet fastener assembly mated with a component in which first legs and second legs are fully folded, according to an embodiment of the present disclosure.

FIG. 9 illustrates a perspective view of the rivet fastener assembly 100 mated with the component 202 in which the first legs 138 and the second legs 144 are fully folded, according to an embodiment of the present disclosure. As shown, the portion of the pin 102 extending above the collar 128 has been removed.

The first or component-engaging legs 138 fold and outwardly expand to securely clamp the component 202 between the collar 128 and the component-engaging legs 138. The relatively long component-engaging legs 138 outwardly fold when the pin 102 is upwardly pulled and the collar 128 remains secured to the component 202 to accommodate holes 200 of various sizes. That is, the component-engaging legs 138 adaptively secure the rivet fastener assembly 100 to components having various sized holes. The second or reinforcing legs 144 fold and abut into the component-engaging legs 138 opposite from a portion of the component-engaging legs 138 that directly engage the component 202. The reinforcing legs 144 provide a reinforcing, bracing support for the component-engaging legs 138 that ensures that the component-engaging legs 138 securely engage the component 202.

The rivet fastener assembly 100 and the component(s) 202 form a securing system 101, when the rivet fastener assembly 100 couples to the component(s) 202, such as shown in FIG. 9.

Figure 10:
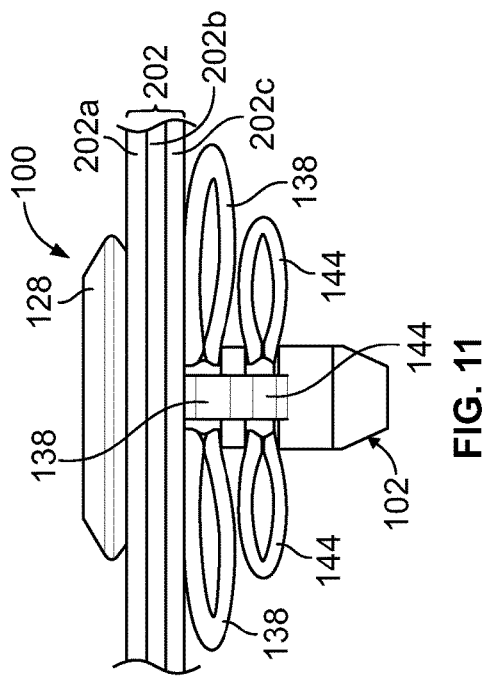
FIG. 10 illustrates an and view of a rivet fastener assembly secured to a component, according to an embodiment of the present disclosure.
Figure 11:
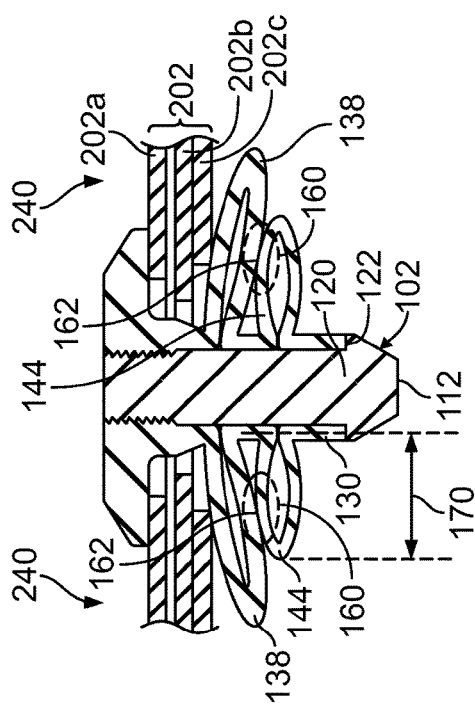
FIGS. 11 and 12 illustrate lateral views of a rivet fastener assembly secured to a component, according to an embodiment of the present disclosure.
Figure 12:
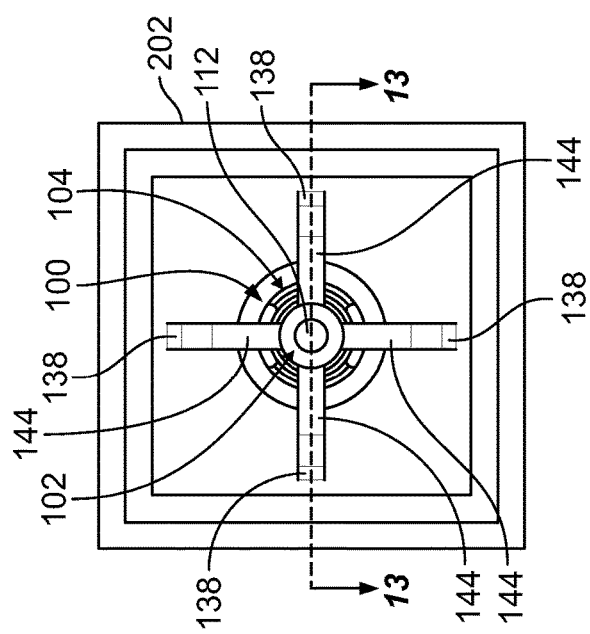
Figure 13:
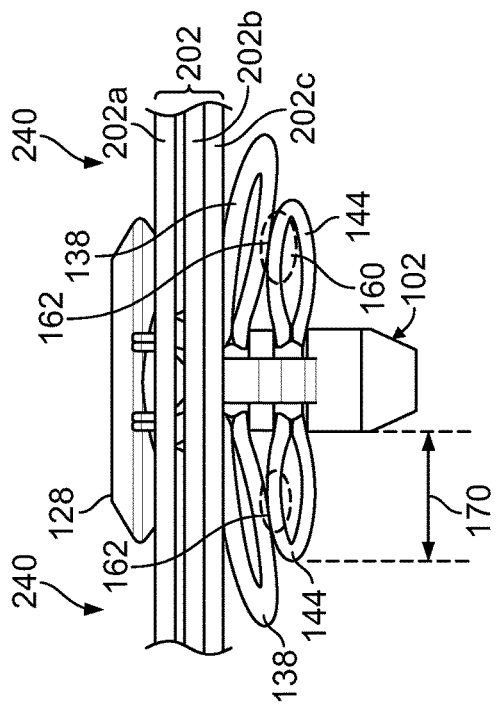
FIG. 13 illustrates a cross-sectional view of a rivet fastener assembly secured to a component through line 13-13 of FIG. 10, according to an embodiment of the present disclosure.

FIG. 10 illustrates an end view of the rivet fastener assembly 100 secured to the component 202. FIGS. 11 and 12 illustrate lateral views of the rivet fastener assembly 100 secured to the component 202. FIG. 13 illustrates a cross-sectional view of the rivet fastener assembly 100 secured to the component 202 through line 13-13 of FIG. 10. As shown in FIG. 10, the component 202 may include multiple components 202a, 202b, and 202c. Further, the rivet fastener assembly 100 is shown having four first legs 138 and four second legs 144. Optionally, the rivet fastener assembly 100 may include more or less first legs 138 and second legs 144 than shown.

When the rivet fastener assembly 100 is fully mated with the component 202, the rivet fastener assembly 100 may securely clamp the multiple components 202a, 202b, and 202c (such as panels) together, as shown in FIG. 11. When installed, the first legs 138 fold over the second legs 144. The folded second legs 144 stabilize and reinforce the first legs 138 when a load is applied to the first legs 138.

When a load 240 is exerted into the component 202, the load 240 is transferred to the first legs 138, which causes the first legs 138 to bend at locations 160. That is, the first legs 138 bend into the second legs 144 upon exertion of the load 240. Under increased loads 240, the first legs 138 contact the second legs 144 at interfaces 162, as shown in FIGS. 12 and 13. The second legs 144 change the bending fulcrums of the first legs 138 (for example, by outwardly displacing the bending fulcrums), and reinforce the first legs 138 by distributing the load 240 along the folded distance 170 of the second legs 144, such as shown in FIGS. 12 and 13.

Figure 14:
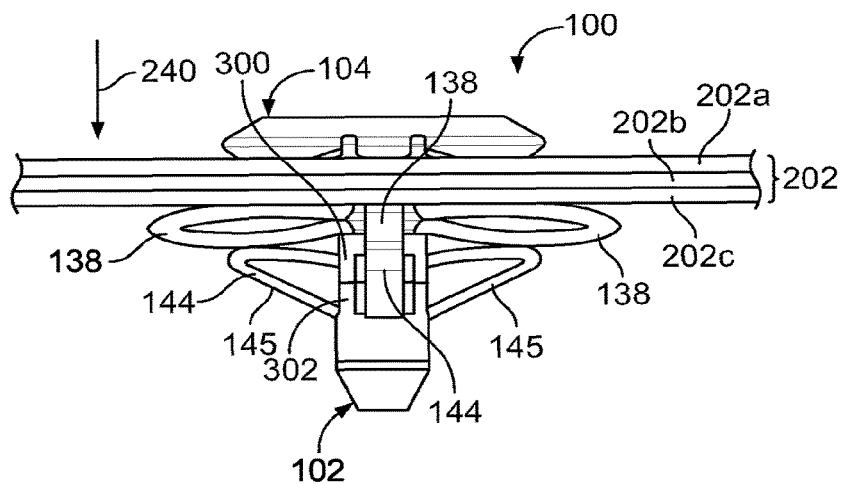
FIG. 14 illustrates a lateral view of a rivet fastener assembly secured to a component, according to an embodiment of the present disclosure.

FIG. 14 illustrates a lateral view of a rivet fastener assembly 100 secured to a component 202, according to an embodiment of the present disclosure. In this embodiment, the grommet 104 includes opposed standoff members 300 and 302 (such as posts, columns, studs, rings, collars, and/or the like) that abut into one another as the first legs 138 and the second legs 144 fold. In this manner, the standoff members 300 and 302 cooperate to provide a positive stopping point in the assembled position, thereby halting further folding of the first legs 138 and the second legs 144. As the first legs 138 and the second legs 144 fold, the standoff members 300 and 302 move towards and into one another. When the standoff members 300 and 302 contact one another, the second legs 144 provide straighter bracing supports 145, which provide increased structural reinforcement to the first legs 138. As such, the interaction of the standoff members 300 and 302 controls the shape of the second legs 144 as they fold, thereby providing increased structural retention of the components 202a-202c under load. The bracing supports 145 resist further downward (as shown in FIG. 14) movement of the first legs 138 and the second legs 144 in the direction of the load 240. The standoff members 300 and 302 may be used with any of the embodiments described herein.

Figure 15:
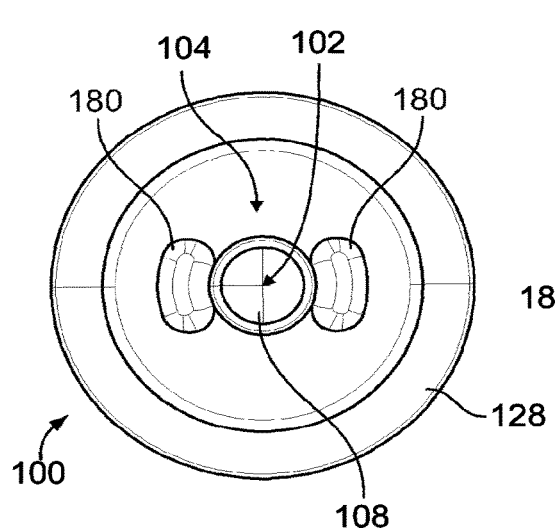
FIG. 15 illustrates a first end view of a rivet fastener assembly, according to an embodiment of the present disclosure.
Figure 16:
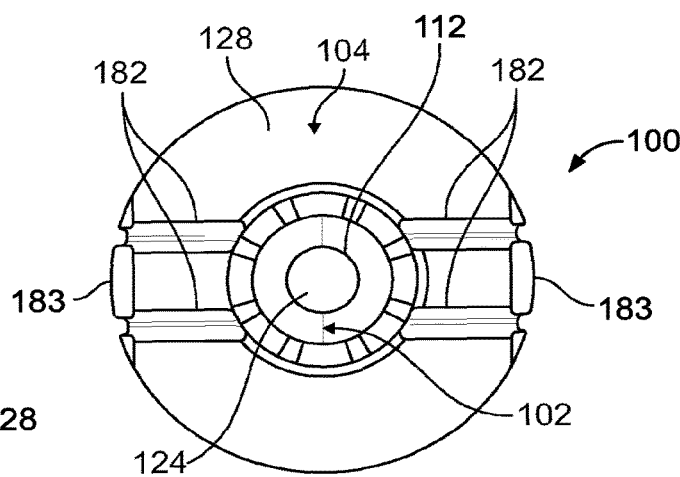
FIG. 16 illustrates a second end view (that is opposite the first end view of FIG. 15) of a rivet fastener assembly, according to an embodiment of the present disclosure.

FIG. 15 illustrates a first end view of a rivet fastener assembly 100, according to an embodiment of the present disclosure. FIG. 16 illustrates a second end view (that is opposite the first end view of FIG. 15) of the rivet fastener assembly 100. Referring to FIGS. 15 and 16, the rivet fastener assembly 100 may include one or more features that allow for quick and easy servicing. For example, tool-engagement channels, such as tear slots 180, may be formed through a first surface of the collar 128, while tool-engagement channels, such as tear slots or perforations 182, may also be formed through a second surface of the collar 128. The tear slots 180 and 182 are configured to receive operative portions of a tool (for example, needle nose pliers) so that tabs 183 of the collar 128 may be removed via the tool. In at least one embodiment, the tear slots 180 and 182 define the tabs 182 therebetween.

After the tabs 183 are removed, retention pressure is released from the pin 102. For example, the tabs 183 may be coupled to structures (such as a threaded interface) that securely couple the pin 102 to the grommet 104. As such, the pin 102 may be pushed in, thereby allowing the legs 138 and 144 (shown, for example, in FIGS. 1-9) to unfold, and the rivet fastener assembly 100 to be removed from a component. The tear slots 180, 182 and removable tabs 183 may be used with any of the embodiments described herein.

Figure 17:
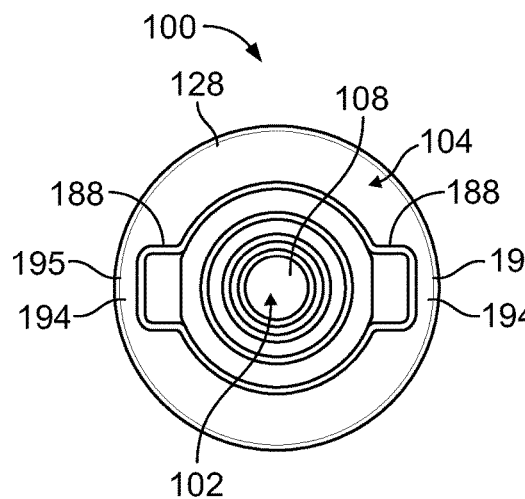
FIG. 17 illustrates a first end view of a rivet fastener assembly, according to an embodiment of the present disclosure.
Figure 18:
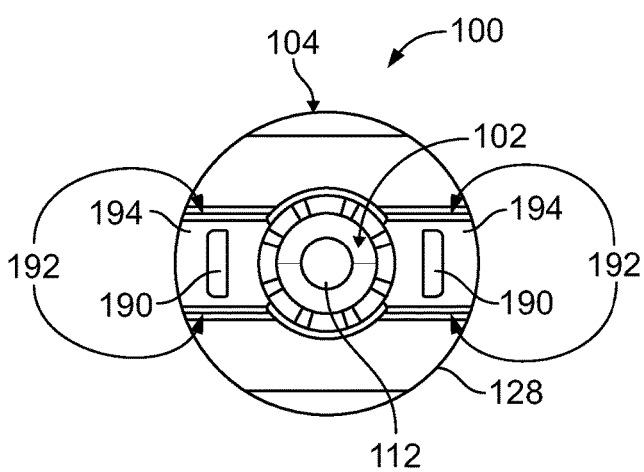
FIG. 18 illustrates a second end view (that is opposite the first end view of FIG. 17) of a rivet fastener assembly, according to an embodiment of the present disclosure.

FIG. 17 illustrates a first end view of a rivet fastener assembly 100, according to an embodiment of the present disclosure. FIG. 18 illustrates a second end view (that is opposite the first end view of FIG. 17) of the rivet fastener assembly 100, Referring to FIGS. 17 and 18, the collar 128 may include tear slots 188, 190, and/or tear slots 192 that allow a common tool to remove tabs 194. The tear slots 190 may be located inside an outer diameter of the collar 128, thereby defining outer shields 195. An operative portion of a tool may pass into the tear slots 190, while the shields 195 protect a component from being damaged by the tool. The tear slots 188, 190, tabs 194, and shields 195 may be used with any of the embodiments described herein.

Figure 19:
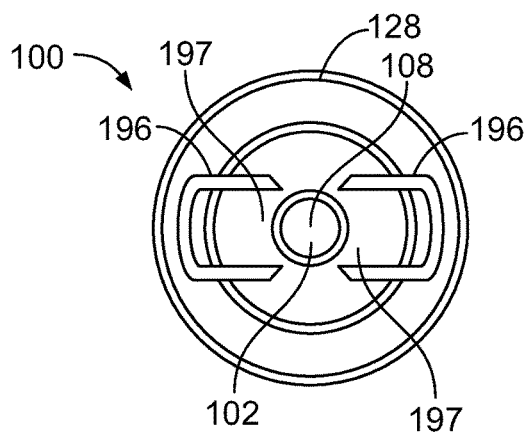
FIG. 19 illustrates a first end view of a rivet fastener assembly, according to an embodiment of the present disclosure.
Figure 20:
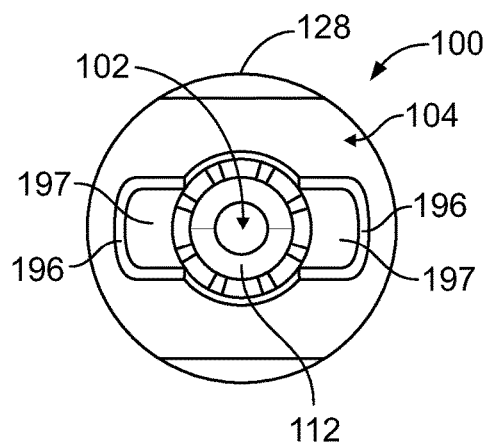
FIG. 20 illustrates a second end view (that is opposite the first end view of FIG. 19) of a rivet fastener assembly, according to an embodiment of the present disclosure.

FIG. 19 illustrates a first end view of a rivet fastener assembly 100, according to an embodiment of the present disclosure. FIG. 20 illustrates a second end view (that is opposite the first end view of FIG. 19) of the rivet fastener assembly 100. Referring to FIGS. 19 and 20, tear slots 196 are formed through the collar 128. The tear slots 196 are configured to receive an operative end of a tool in order to remove the tabs 197. The tear slots 196 may be C-shaped. Optionally, the tear slots 196 may be sized and shaped differently than shown. The tear slots 196 may be used with any of the embodiments describe therein.

Figure 21:
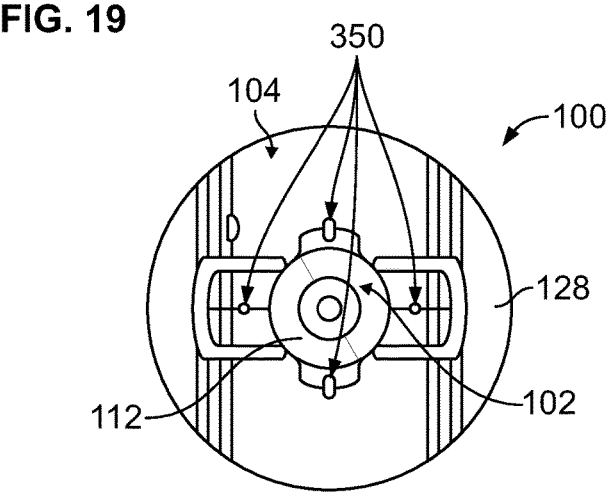
FIG. 21 illustrates a second end view of a rivet fastener assembly, according to an embodiment of the present disclosure.
Figure 22:
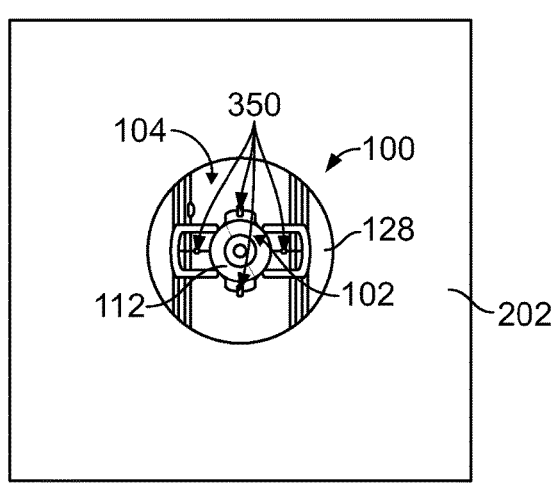
FIG. 22 illustrates a second end view of a rivet fastener assembly secured to a component, according to an embodiment of the present disclosure.
Figure 23:
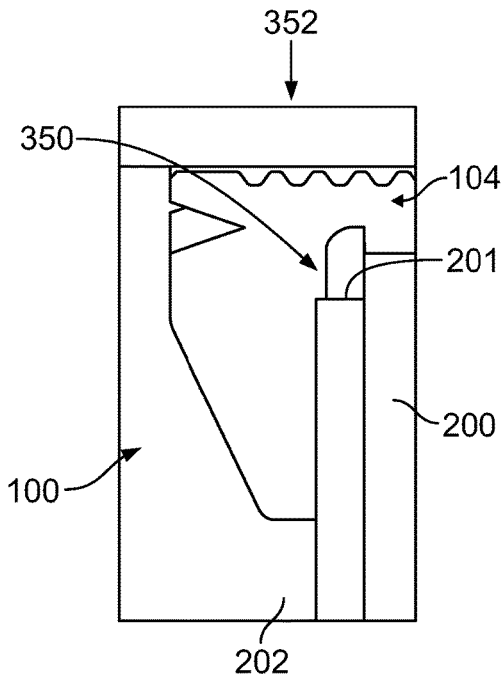
FIG. 23 illustrates a cross-sectional view of interfering protuberances interacting with a component, according to an embodiment of the present disclosure.

FIG. 21 illustrates a second end view of a rivet fastener assembly 100, according to an embodiment of the present disclosure. FIG. 22 illustrates a second end view of the rivet fastener assembly secured 100 to the component 202. FIG. 23 illustrates a cross-sectional view of interfering protuberances 350 interacting with the component 200. Referring to FIGS. 21-23, the rivet fastener assembly 100 may include the interfering protuberances 350, which extend from the collar 128. The interfering protuberances 350 may be studs, barbs, blocks, semi-spherical structures, nubs, and/or the like. As shown, the rivet fastener assembly 100 may include four regularly-spaced interfering protuberances 350. Optionally, the rivet fastener assembly 100 may include more or less interfering protuberances.

The interfering protuberances 350 provide anti-movement structures that are configured to interact with an edge 201 of the component 202 that defines the hole 200. The interfering protuberances 350 eliminate, minimize or otherwise reduce axial movement of the installed rivet fastener assembly 100 when securing components 202 with holes or slots larger than a minimum or nominal hole size.

As shown in FIG. 23, the interfering protuberances 350 engage the edge 201 of the component 200 in response to application of force 352. The interfering engagement of the interfering protuberances 350 with the component 200 stops the grommet 104 from moving into the edge 201 of the panel 200. The interfering protuberances 350 may be used with any of the embodiments described herein.

Figure 24:
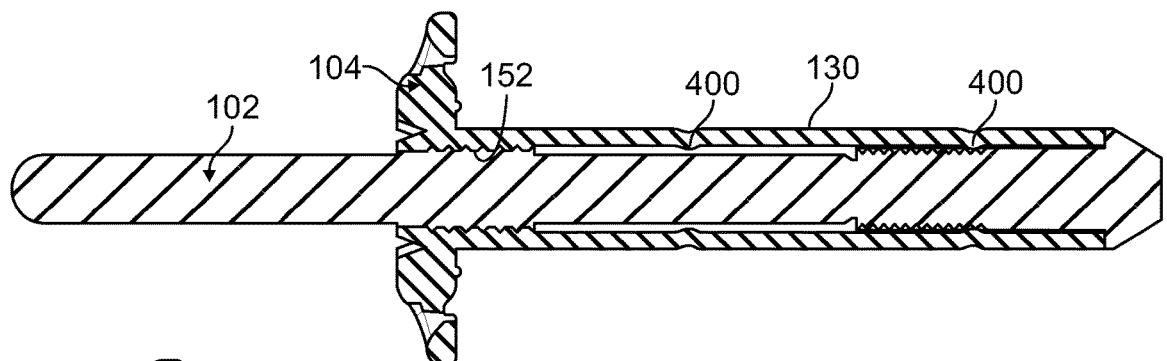
FIG. 24 illustrates an axial cross-sectional view of a rivet fastener assembly including a pin and a grommet, according to an embodiment of the present disclosure.
Figure 25:
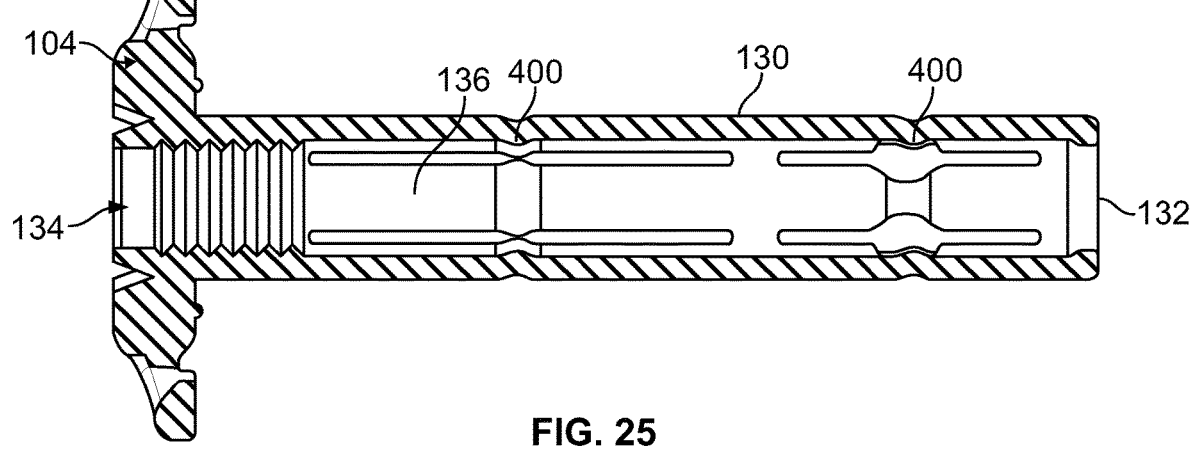
FIG. 25 illustrates an axial cross-sectional view of a grommet, according to an embodiment of the present disclosure.

FIG. 24 illustrates an axial cross-sectional view of a rivet fastener assembly 100 including a pin 102 and a grommet 104, according to an embodiment of the present disclosure. FIG. 25 illustrates an axial cross-sectional view of the grommet, 104. Referring to FIGS. 24 and 25, the column 130 may include flex members 400 (such as indented, creased, or recessed wall segments, ring segments, rim segments, or the like) that are inwardly-directed into the central passage 136. The flex members 400 may be located within the column 130 of the grommet 104. In at least one embodiment, the flex members 400 extend over an entire internal circumference of the column 130 that defines an axial portion of the central passage 136.

The flex members 400 contact the pin 102 during installation and maintain contact with the pin 102 as the pin 102 is assembled with the grommet 104. As the flex members 400 contact the pin 102, the flex members 400 tend to outwardly bias the legs 138 and 144 (shown in FIGS. 1-3, for example), thereby allowing for lower installation force and proper installation and termination of the pin 102. That is, the flex members 400 promote easier flexing of the legs 138 and 144. The flex members 400 may be used with any of the embodiments described herein.

Figure 26:
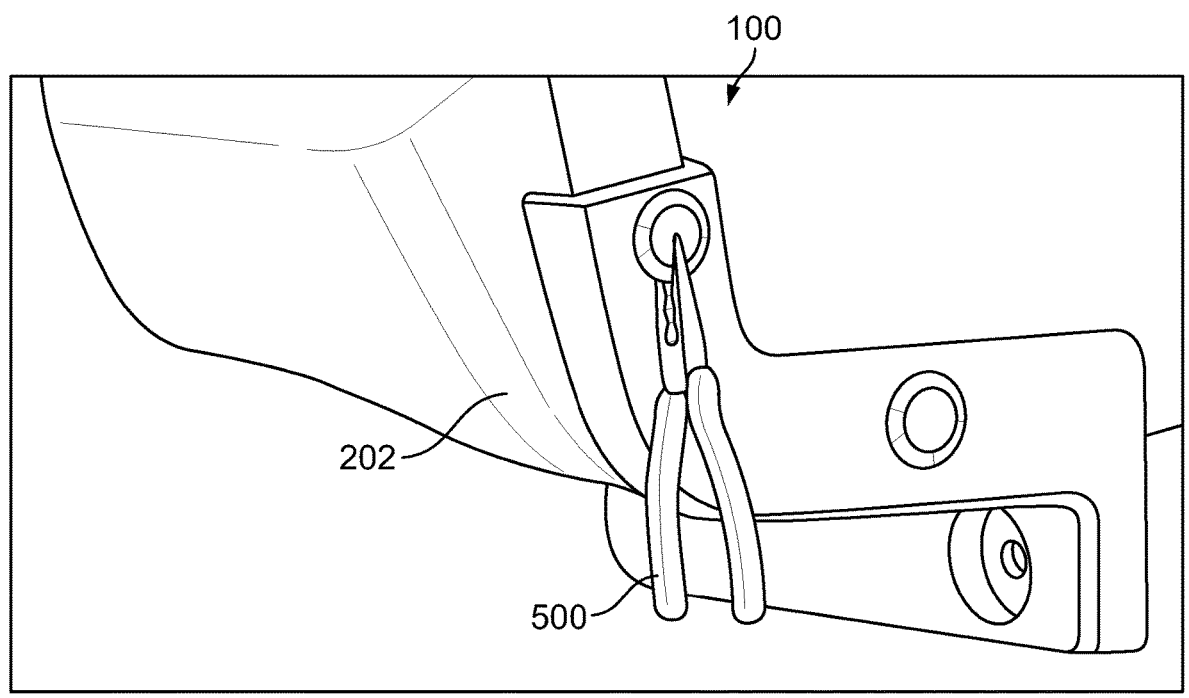
FIG. 26 illustrates a perspective view of a tool being used to remove a rivet fastener assembly from a component, according to an embodiment of the present disclosure.

FIG. 26 illustrates a perspective view of a tool 500 (such as needle nose plier) being used to remove a rivet fastener assembly 100 from a component 202, according to an embodiment of the present disclosure. The tool 500 may be used to tear tabs off of the fastener assembly 100 in order to facilitate easy and safe removal of the rivet fastener assembly 100, as described herein. The rivet fastener assembly 100 may include one or more tear slots that are engaged by the tool 500 in order to ensure that the tabs are easily removed.

As described herein, embodiments of the present disclosure provide rivet fastener assemblies that do not require a hole of a component to be modified in order to be used. That is, the rivet fastener assemblies are configured to adapt to different-sized holes. Further, embodiments of the present disclosure provide rivet fastener assemblies that are configured to be used with existing trim and panel holes, and allow for a wider range of hole shapes and sizes. Also, embodiments of the present disclosure provide rivet fastener assemblies that may be installed without specialized tools. Moreover, embodiments of the present disclosure provide rivet fastener assemblies that are configured to be easily and safely serviced and/or removed.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A rivet fastener assembly that is configured to securely clamp onto one or more components, the rivet fastener assembly comprising:
   a grommet including a collar and a column extending from the collar, wherein a passage is defined through the collar and the column, wherein the column comprises:
      component-engaging legs that are configured to fold and directly contact the one or more components when folded; and
      reinforcing legs that are configured to fold and reinforce the component-engaging legs when folded as the component-engaging legs directly contact the one or more components, wherein when the component-engaging legs and the reinforcing legs are folded, a medial point on a bottom surface of the component-engaging legs contacts a medial point on a top surface of the reinforcing legs, and wherein the component-engaging legs are longer than the reinforcing legs.

2. The rivet fastener assembly of claim 1, wherein the component-engaging legs and the reinforcing legs are configured to be moved between a linear at-rest state and a folded state.

3. The rivet fastener assembly of claim 1, further comprising a pin that is configured to secure into the passage of the grommet, wherein the pin is configured to be pulled relative to the grommet when the rivet fastener assembly is coupled to the one or more components in order to fold the component-engaging legs and the reinforcing legs.

4. The rivet fastener assembly of claim 3, wherein the pin is configured to secure to the grommet within at least a portion of the passage.

5. The rivet fastener assembly of claim 1, wherein the grommet comprises one or more tear slots that are configured to be engaged by a tool in order to remove one or more tabs, wherein removal of the one or more tabs facilitates removal of the rivet fastener assembly from the one or more components.

6. The rivet fastener assembly of claim 5, wherein the grommet further comprises one or more shields proximate to the one or more tear slots, wherein the one or more shields protect the one or more components from damage during removal of the rivet fastener assembly from the one or more components.

7. The rivet fastener assembly of claim 1, wherein the grommet further comprises one or more interfering protuberances that are configured to limit axial movement of the rivet fastener assembly in relation to the one or more components.

8. The rivet fastener assembly of claim 1, wherein the column of the grommet comprises one or more flex members that are inwardly-directed into the passage, wherein the one or more flex members are configured to facilitate flexing of one or both of the component-engaging legs and the reinforcing legs.

9. A securing system comprising:
one or more components; and
a rivet fastener assembly that securely clamps onto the one or more components, the rivet fastener assembly comprising:
a grommet including a collar and a column extending from the collar, wherein a passage is defined through the collar and the column, wherein the column comprises:
component-engaging legs that are configured to fold and directly contact the one or more components when folded; and
reinforcing legs that are configured to fold and reinforce the component-engaging legs when folded as the component-engaging legs directly contact the one or more components, wherein the component-engaging legs and the reinforcing legs are configured to be moved between a linear at-rest state and a folded state; and
a pin that is secured into the passage of the grommet, wherein the pin is configured to be pulled relative to the grommet when the rivet fastener assembly is coupled to the one or more components in order to fold the component-engaging legs and the reinforcing legs,
wherein the grommet further comprises opposed standoff members that contact each other to halt further folding of the component-engaging legs and the reinforcing legs.

10. The securing system of claim 9, wherein the pin is secured to the grommet within at least a portion of the passage.

11. The securing system of claim 9, wherein the component-engaging legs are longer than the reinforcing legs.

12. The securing system of claim 9, wherein the reinforcing legs provide straightened bracing supports when the opposed standoff members contact one another, wherein an interaction of the opposed standoff members controls a shape of the reinforcing legs as the reinforcing legs are folded.

13. The securing system of claim 9, wherein the grommet comprises one or more tear slots that are configured to be engaged by a tool in order to remove one or more tabs, wherein removal of the one or more tabs facilitates removal of the rivet fastener assembly from the one or more components.

14. The securing system of claim 13, wherein the grommet further comprises one or more shields proximate to the one or more tear slots, wherein the one or more shields protect the one or more components from damage during removal of the rivet fastener assembly from the one or more components.

15. The securing system of claim 9, wherein the grommet further comprises one or more interfering protuberances that are configured to limit axial movement of the rivet fastener assembly in relation to the one or more components.

16. The securing system of claim 9, wherein the column of the grommet comprises one or more flex members that are inwardly-directed into the passage, wherein the one or more flex members are configured to facilitate flexing of one or both of the component-engaging legs and the reinforcing legs.

17. A rivet fastener assembly that is configured to securely clamp onto one or more components, the rivet fastener assembly comprising:
a grommet including: (a) a collar, (b) a column extending from the collar, wherein a passage is defined through the collar and the column, (c) one or more tear slots that are configured to be engaged by a tool in order to remove one or more tabs, wherein removal of the one or more tabs facilitates removal of the rivet fastener assembly from the one or more components, (d) one or more shields proximate to the one or more tear slots, wherein the one or more shields protect the one or more components from damage during removal of the rivet fastener assembly from the one or more components, and (e) one or more interfering protuberances that are configured to limit axial movement of the rivet fastener assembly in relation to the one or more components, wherein the column comprises:
component-engaging legs that are configured to fold and directly contact the one or more components when folded, wherein the component-engaging legs have a first length; and
reinforcing legs that are configured to fold and reinforce the component-engaging legs when folded as the component-engaging legs directly contact the one or more components, wherein the reinforcing legs have a second length that is shorter than the first length, wherein the component-engaging legs and the reinforcing legs are configured to be moved between a linear at-rest state and a folded state, and wherein when the component-engaging legs and the reinforcing legs are folded, a medial point on a bottom surface of the component-engaging legs contacts a medial point on a top surface of the reinforcing legs; and
a pin that is configured to secure into the passage of the grommet, wherein the pin is configured to be pulled relative to the grommet when the rivet fastener assembly is coupled to the one or more components in order to fold the component-engaging legs and the reinforcing legs, wherein the pin is configured to secure to the grommet within at least a portion of the passage.

* * * * *